United States Patent [19]

Greving et al.

[11] Patent Number: 4,641,142

[45] Date of Patent: Feb. 3, 1987

[54] TACAN BEACON

[75] Inventors: Gerhard Greving, Untergruppenbach; Günther Höfgen, Kornwestheim; Rüdiger Zeitz, Ditzingen, all of Fed. Rep. of Germany

[73] Assignee: International Standard Electric Corporation, New York, N.Y.

[21] Appl. No.: 594,598

[22] Filed: Mar. 29, 1984

[30] Foreign Application Priority Data

Mar. 30, 1983 [DE] Fed. Rep. of Germany ....... 3311569

[51] Int. Cl.⁴ .............................................. G01S 1/46
[52] U.S. Cl. ................................................... 342/399
[58] Field of Search ...................... 343/399, 398, 404; 364/451

[56] References Cited

U.S. PATENT DOCUMENTS 3,474,447  5/1968  Melancon ........................ 343/399 X
3,587,099  6/1971  Kramar .............................. 343/399
3,747,102  7/1973  Cooper ............................... 343/399

Primary Examiner—Theodore M. Blum
Assistant Examiner—Mark Hellner
Attorney, Agent, or Firm—John T. O'Halloran; Robert P. Seitter

[57] ABSTRACT

A TACAN beacon is disclosed in which the pulse-modulated carrier signal generated in a transmitter is applied to the elements of a circular antenna array through controllable phase shifters that generate 15-Hz and 135-Hz sidebands, through switches, and through a Butler matrix. A switching facility generates two states. In the first state, the phase shifters are controlled to generate the upper and lower 15-Hz sidebands and the upper 135-Hz sideband, respectively. In the second state, they are controlled to form the respective opposite sidebands.

The Butler matrix generates, radio-frequency phase-rotation fields at the antenna. In the two states, the ordinal numbers of the radio-frequency phase-rotation fields differ in their signs. The absolute value of the largest ordinal number is smaller than or equal to six, and the sum of the absolute values of the ordinal numbers for the carrier signal and the upper or lower 135-Hz sideband is equal to 9.

7 Claims, 1 Drawing Figure

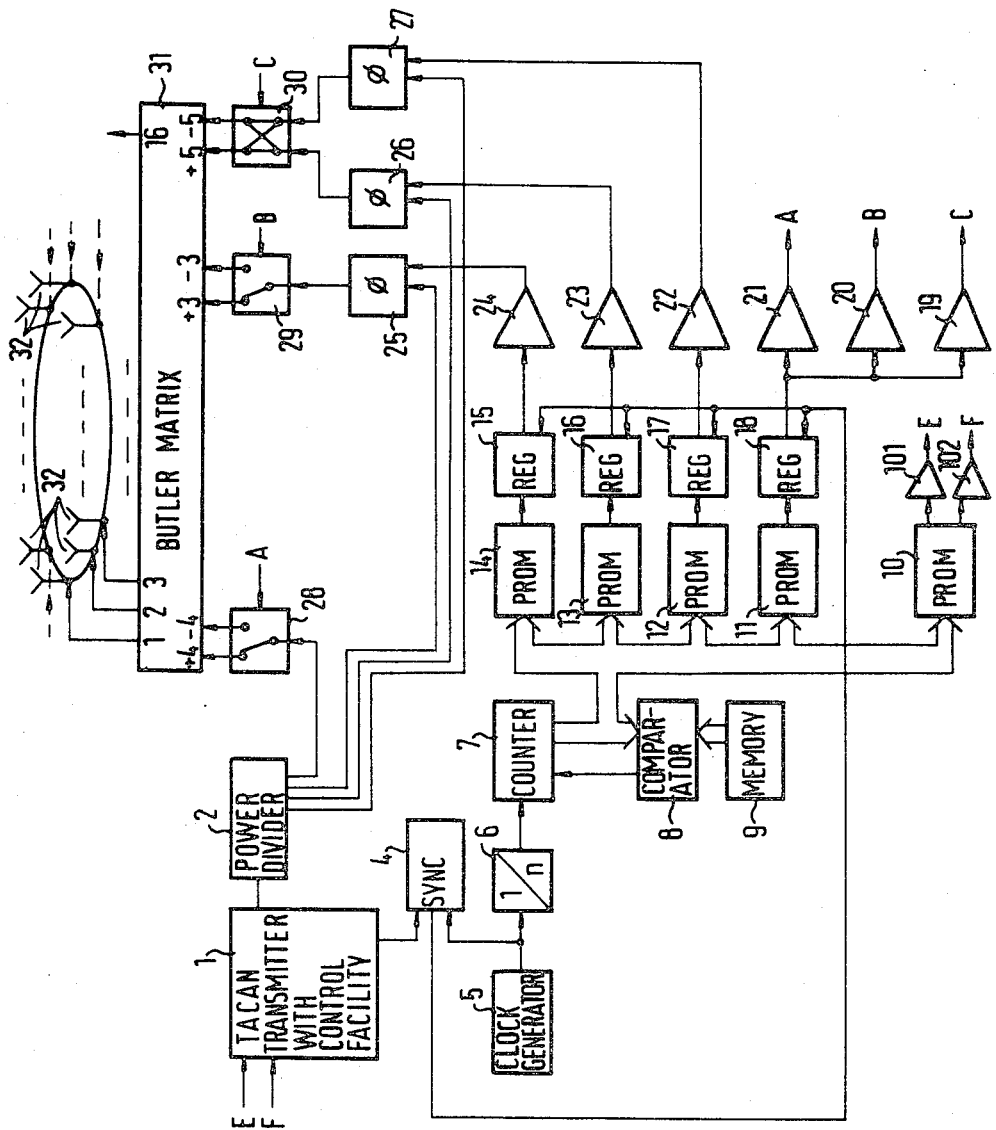

TACAN BEACON

BACKGROUND OF THE INVENTION

The present invention relates generally to transmitting equipment, and more particularly to a TACAN beacon. Various constructions of beacons used in radio navigation are already known. So, for instance, one such construction is disclosed in German Pat. No. 27 15 383. This beacon comprises a transmitter and an antenna consisting of a plurality of radiating elements arranged on a circle. Pulse-modulated radio-frequency signals generated in the transmitter are fed to the radiating elements through a power-distribution and phase-shift network that generates different radio-frequency phase-rotation fields under the control of a control facility. It is also stated there that the principle underlying the described VOR can also be used for implementing a TACAN beacon. It is well known that, in a TACAN beacon, the radiated signals consist of a carrier signal, a 15-Hz coarse bearing signal, and a 135-Hz fine bearing signal. There it is stated that the principle underlying the VOR described can also be used for implementing a TACAN beacon.

In the case of the known TACAN beacon, the upper and lower 15-Hz sideband signals of the carrier and the upper and lower 135-Hz sideband signals of the carrier are simultaneously present in space as the 15-Hz coarse bearing and 135-Hz fine bearing signals. If the principle of radio-frequency phase-rotation fields is to be used for such a TACAN beacon, an antenna consisting of at least 27 to 36 radiating elements is necessary, because a mode spread (difference between the ordinal numbers of the absolute value of the radio-frequency phase-rotation fields) of 18 is required to generate the 135-Hz sideband signals; the largest ordinal number is thus $\geq |9|$.

SUMMARY OF THE INVENTION

Accordingly, it is a general object of the present invention to avoid the disadvantages of the prior art.

More particularly, it is an object of the present invention to provide a TACAN beacon which does not possess the disadvantages of the known beacons of this type.

Still another object of the present invention is so to construct the TACAN beacon as to keep the number of radiating elements to a minimum.

It is yet another object of the present invention to simplify the construction of the TACAN beacon compared to the known constructions, without sacrificing any of the features of the known constructions or requiring modifications of the receiving equipment.

A concomitant object of the present invention is so to design the beacon of the type here under consideration as to be simple in construction, relatively inexpensive, easy to operate, and reliable in operation nevertheless.

In pursuance of these objects and others which will become apparent hereafter, the beacon is constructed that, to generate the 15-Hz coarse bearing signal, the upper and lower 15-Hz sideband signals of the carrier signal are generated simultaneously, that, to generate the 135-Hz fine bearing signal, the upper 135-Hz sideband signal of the carrier signal is generated during a first state of the control facility, and the lower 135-Hz sideband signal of the carrier signal is generated during a second state of the control facility, and that during both states different radio-frequency phase-rotation fields are generated for all signals to be radiated, In the novel TACAN beacon, the two 135-Hz sideband signals are generated successively rather than simultaneously. This reduces the mode spread to 9, and the ordinal number having the largest absolute value is 5, which permits the number of radiating elements to be reduced to 16. As a result, the amount of technical complexity is greatly reduced.

It is possible to derive the sidebands from the carrier signal by means of controllable phase shifters.

BRIEF DESCRIPTION OF THE DRAWINGS

An embodiment of the invention will now be explained in more detail with reference to the accompanying drawing the, sole FIGURE of which is a block diagram of the novel TACAN beacon.

DETAILED DESCRIPTION OF THE PREFERRED EMBODIMENT

A TACAN transmitter 1 generates, in a manner known per se, the signals to be fed to the TACAN antenna. The transmitter can be of the kind described by M. Kayton and W. R. Fried in the book "Avionics Navigation Systems", John Wiley & Sons, Inc., New York, 1969, pages 187 to 192. It contains a control facility which causes the necessary pulse pairs and pulse groups to be transmitted. Two signals E and F applied to the transmitter 1 cause the latter to transmit the main reference pulses and the auxiliary reference pulses at the correct instants. The control facility generates a trigger pulse about 6 $\mu$s prior to the delivery of each pulse pair or pulse group. This trigger pulse is applied to a synchronizing facility 4.

A power divider 2 divides the output signal of the TACAN transmitter 1 into four signals which are applied to a first switch 28, a first controllable phase shifter 25, a second controllable phase shifter 26, and a third controllable phase shifter 27, respectively. The output of the first phase shifter is applied to the second switch 29, and the outputs of the second and third phase shifters are applied to a third switch 30. The first switch 28 and the second switch 29 are arranged to apply the signals fed to them to a first (+4) or a second (−4) input, or to a third (+3) or a fourth (−3) input, respectively, of a Butler maxtrix 31. The third switch 30 is arranged to apply one of the signals fed to it to a fifth input (+5) and the other of such signals to a sixth input (−5) of the Butler matrix 31 in its first position. In its other position, it applies the signals fed to it to the respective other inputs (−5 and +5) of the Butler matrix 31.

The Butler matrix 31 of the embodiment shown has six inputs and sixteen outputs, i.e., the conventional Butler matrix, in which the number of inputs is equal to the number of outputs, has been modified accordingly. Each output is connected to a different radiating element 32. The radiating elements 32 are equally spaced on a circle. The signal applied to an input of the matrix 31 is evenly distributed to the sixteen outputs, but the output signals differ in phase. The Butler matrix 31 is presented with four signals at a time; consequently, four signals are present at each of the sixteen outputs of the Butler matrix 31, which are superposed on each other vectorially. The Butler matrix is designed to produce the desired phase shifts (phase modes) and power distributions.

A clock generator 5 generates a 6.048-MHz clock signal. This signal is fed to the synchronizing circuit 4 and to a divider 6, whose output provides a 2,160-Hz signal. In the synchronizing circuit 4, the trigger pulse from the TACAN transmitter 1 is synchronized with the clock signal from the clock generator 5. The frequency of the clock generator 5 is chosen to be so high that the synchronization causes only a short delay of the trigger pulse, so that between the actuation of the switches 28 to 30 and phase shifters 25 to 27 yet to be discussed by the synchronized trigger pulse and the delivery of the radio-frequency pulses, sufficient time ($\leq 6$ μs) remains for completing the switching of the switches 28 to 30 and phase shifters 25 to 27. Thus, the instant of switching remains in a space beween pulse pairs or pulse groups and cannot overlap a pulse pair or pulse group. The output of the divider 6 is applied to a counter 7, which is reset to zero after reaching a count of m=143. To accomplish this, the beacon includes a memory 9, in which the number m=143 is stored, and a comparator 8, which resets the counter 7.

The beacon further contains read-only memories 10 to 14, whose addresses are selected by means of the counts of the counter 7.

The trigger pulse causes the data present in the read-only memories 11 to 14 at the instant of its occurrence to be transferred into registers 15 to 18. Since the trigger pulse is synchronized with the clock pulse, it is insured that the data at the outputs of the read-only memories 11 to 14 are not changed at the very moment when the registers 15 to 18 are being set by the trigger pulse.

At given counts of the counter 7, a read-only memory PROM 10 provides at its outputs E and F pulses which pass through driver stages 101 and 102, respectively, and trigger the generation of the main reference-pulse group and the auxiliary reference-pulse group, respectively, in the TACAN transmitter 1. The outputs E and F are connected to the inputs E and F of the TACAN transmitter 1.

The registers 15 to 17 that are respectively arranged behind the read-only memories (PROMs) 14 to 12 are followed by driver stages 24 to 22, each of which controls a respective controllable phase shifter 25, 26 or 27. The phase shifters 25, 26 and 27 are 4-bit digital phase shifters. They are controlled via the PROMs 12 to 14, registers 15 to 17, and driver stages 26 to 24 in such a way as to alternately generate an upper sideband and a lower sideband of the carrier applied to them. The output of the first controllable phase shifter 25 is applied to the second switch 29, and the outputs of the phase shifters 26 and 27 are fed to the third switch 30. The output of the register 18, which follows the fourth PROM 11, is applied to three driver stages 19, 20 and 21, whose output signals switch the switches 28, 29, and 30.

As mentioned, the signals at the outputs of the Butler matrix 31 differ in phase at a sufficiently low amplitude. These phase shifts can also be produced by means of individual controllable phase shifters. Such a solution is equivalent to the Butler matrix, because in both cases signals differing in phase by different amounts are obtained at several outputs.

The operation of the novel TACAN beacon is as follows. To generate the 15-Hz coarse bearing signal and the 135-Hz fine bearing signal, the signal generated by the TACAN transmitter 1 must be amplitude-modulated at 15-Hz and 135-Hz, with the phase depending on the azimuth. In the TACAN beacon disclosed in the book cited above, this is accomplished by mechanical pattern rotation. In the novel TACAN beacon of the present invention, the upper and lower 15-Hz sidebands are generated simultaneously by means of the controllable phase shifters 25, 26, and the upper and lower 135-Hz sidebands are generated successively by means of the controllable phase shifter 27. In addition, different radio-frequency phase-rotation fields are generated during two states, which are described in the following.

State I

The first switch 28 applies the carrier signal to the first input of the Butler matrix 31. A radio-frequency phase-rotation field with the ordinal number +4 is generated.

The controllable phase shifter 25 is controlled to provide the upper 15-Hz sideband at its output. This side-band is applied to the third input of the Butler matrix 31. A radio-frequency phase-rotation field with the ordinal number +3 is generated.

The controllable phase shifter 26 is controlled to provide the lower 15-Hz sideband, which is applied to the fifth input of the Butler matrix 31. A radio-frequency phase-rotation field with the ordinal number +5 is generated.

The controllable phase shifter 27 is controlled to provide the upper 135-Hz sideband, which is applied to the sixth input of the Butler matrix 31. A radio-frequency phase-rotation field with the ordinal number −5 is generated.

State II

The first switch 28 applies the carrier signal to the second input of the Butler matrix 31. A radio-frequency phase-rotation field with the ordinal number −4 is generated.

The controllable phase shifter 25 is controlled to provide the lower 15-Hz sideband, which is applied to the fourth input of the Butler matrix 31. A radio-frequency phase-rotation field with the ordinal number −3 is generated.

The controllable phase shifter 26 is controlled to provide the upper 15-Hz sideband, which is applied to the sixth input of the Butler matrix 31. A radio-frequency phase-rotation field with the ordinal number −5 is generated.

The controllable phase shifter 27 is controlled to provide the lower 135-Hz sideband, which is applied to the fifth input of the Butler matrix 31. A radio-frequency phase-rotation field with the ordinal number +5 is generated.

In the presence of a radio-frequency phase-rotation field with the ordinal number ($\pm$)3, the phase difference between the first output and the $v$th output of the Butler matrix is ($\pm$) $(v-1)\cdot 67.5$ degrees; at the ordinal numbers ($\pm$)4 and ($\pm$)5, the values are ($\pm$) $(v-1)\cdot 90$ degrees and ($\pm$) $(v-1)\cdot 112.5$ degrees, respectively.

The switches 28 to 30 and thus the distribution of the output signals of the controllable phase shifters 25 to 27 controlled by the output signals of the driver stages 19 to 21, as mentioned above. Switching from one state to another takes place periodically at 540 Hz. The switching rate must be so high as to permit averaging in the TACAN-signal receiver.

The necessary switch and phase-shifter positions are determined by the counter 7, which counts from 0 to 143 in 1/15 s, and the PROMs 11 to 14. Each count (=address) corresponds to a specified switch and phase-shifter position stored in the PROMs. If 4-bit digital phase shifters are used, the information at the outputs of the PROMs 13 and 14 changes after every 9th address change of the counter 7 in accordance with the 15-Hz modulation of the carrier, and that at the output of the PROM 12 changes after every address change in accordance with the 135-Hz modulation of the carrier. To generate the sidebands, the direction of rotation of each of the phase shifters 25 to 27, which determines the phase gradient, must be controlled to obtain a conventional levorotatory TACAN pattern. The changes in the directions of rotation of the phase shifters 25 to 27 for the two states I and II are controlled by the contents of the PROMs 12 to 14. With the single phase shifter 27, both an upper sideband and a lower sideband are generated, as mentioned above. The direction of rotation of the phase shifter 27 is chosen depending on whether the upper sideband or the lower sideband is to be generated.

The address changes of the counter 7 are also used to control the RF switches 28 to 30. A switching frequency of 540 Hz is achieved, for example, by changing the output of the PROM 11 after every 4th address change. However, the necessary switch and phase-shifter positions are passed on to the switches 28 to 30 and phase shifters 25 to 27 only if the registers 15 to 18 are set by the clock-synchronized trigger pulse immediately before transmitter pulses.

Each of the PROMs 12 to 14 contains a number of addresses equal to the number of states required to control the controllable phase shifters 25, 26, and 27 in such a way that the desired sidebands are generated. The generation of sidebands by means of controllable phase shifters is known per se and, therefore, will not be explained here in greater detail.

The sideband generation described results in an azimuthal rotation of the aperture current distribution produced in the radiating elements 32 by vectorial superposition of the phase modes. The rotating current distribution causes a far-field pattern rotating at the same speed.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A TACAN beacon comprising:
   an antenna consisting of a plurality of radiating elements distributed along a circle;
   a transmitter arrangement including means for generating phase-modulated radio-frequency signals; and
   means for feeding said phase-modulated radio-frequency signals to said radiating elements of said antenna causing the latter to radiate respective 15 Hz coarse bearing and 135 Hz fine bearing signals as respective upper and lower sidebands of a carrier signal, said means for feeding including
   a power-distribution and phase-shift network interposed between said generating means and said radiating elements and operative for forming different radio-frequency phase-rotation fields at said antenna, and means for controlling the operation of said network in two alternating states, said upper and lower sidebands of said coarse-bearing signal being simultaneously transmitted in both states, and only the upper sideband of the fine bearing signal being transmitted in one of said two alternating states while only the lower sideband of the fine bearing signal is transmitted in another of said states, and the signs of the ordinal numbers of the different radio-frequency phase rotation fields of all of the radiated signals differing from one another in each of said two states.

2. The TACAN beacon as defined in claim 1, wherein said controlling means acts in both of said states to cause the absolute value of the largest ordinal number of the radio frequency phase-rotation fields to be no greater than six.

3. The TACAN beacon as claimed in claim 2 wherein said controlling means acts to cause the ordinal numbers of the radio-frequency phase-rotation fields for the carrier signal to always differ from zero, and to cause the absolute value of the difference between the ordinal numbers of the radio-frequency phase-rotation fields for the carrier signal and the upper or lower fine bearing sideband signal to be equal to nine.

4. The TACAN beacon as claimed in claim 1 wherein said controlling means includes means for switching between the two states, and means for operating said switching means in the intervals between two pulses or pulse groups of said radio-frequency signals.

5. The TACAN beacon as claimed in claim 1 wherein the power-distribution and phase-shift network includes a Butler matrix.

6. The TACAN beacon as claimed in claim 5, wherein said Butler matrix is modifed to have fewer inputs than outputs.

7. The TACAN beacon as claimed in claim 1 wherein said network includes means for deriving said sidebands from the carrier signal, including controllable phase shifter means.

* * * * *

UNITED STATES PATENT AND TRADEMARK OFFICE
CERTIFICATE OF CORRECTION

PATENT NO. : 4,641,142
DATED : February 3, 1987
INVENTOR(S) : Gerhard Greving; Günther Höfgen; Rüdiger Zeitz It is certified that error appears in the above-identified patent and that said Letters Patent is hereby corrected as shown below:

Column 1, line 36, change "/9/" to -- 9 --.
Column 1, line 68, before "In" and after "radiated" insert -- with the ordinal numbers of the radio-frequency phase-rotation fields in the two states differing in their signs. --.

Column 2, line 14, change "drawing the," to -- drawing, the --.

Column 3, line 21, change "addreses" to -- addresses --.

Column 4, line 15, change "side-band" to -- sideband --.
Column 4, lines 55,56, before "controlled" and after "27" insert -- is --.

Signed and Sealed this

Twenty-first Day of April, 1992

Attest:

HARRY F. MANBECK, JR.

*Attesting Officer*     *Commissioner of Patents and Trademarks*